United States Patent [19]
Wachi

[11] Patent Number: 5,379,282
[45] Date of Patent: Jan. 3, 1995

[54] SYSTEM FOR CALCULATING FOCUS SERVO CONTROL SIGNAL USING FOCUS ERROR SIGNAL AND REPRODUCED RF SIGNAL

[75] Inventor: Shigeaki Wachi, Tokyo, Japan

[73] Assignee: Sony Corporation, Tokyo, Japan

[21] Appl. No.: 943,675

[22] Filed: Sep. 11, 1992

[30] Foreign Application Priority Data

Sep. 24, 1991 [JP] Japan .................... 3-272073

[51] Int. Cl.⁶ ................................ G11B 7/00
[52] U.S. Cl. ..................... 369/44.35; 369/44.25; 369/44.11
[58] Field of Search ............ 369/44.25, 44.77, 44.29, 369/44.32, 44.34, 44.35, 44.36, 44.11; 250/201.5

[56] References Cited

U.S. PATENT DOCUMENTS

| | | | |
|---|---|---|---|
| 4,677,605 | 6/1987 | Abed | 369/44.23 |
| 4,786,794 | 11/1988 | Doi | 369/44.25 |
| 4,878,211 | 10/1989 | Suzuki et al. | 369/44.35 |
| 5,065,386 | 11/1991 | Takeya et al. | 369/44.35 |
| 5,084,849 | 1/1992 | Ishii et al. | 369/44.35 |
| 5,086,420 | 2/1992 | Doi | 369/44.25 |
| 5,187,696 | 2/1993 | Ishii et al. | 369/44.29 |

FOREIGN PATENT DOCUMENTS

| | | | |
|---|---|---|---|
| 0083838 | 7/1983 | European Pat. Off. | G11B 7/08 |
| 0220039 | 4/1987 | European Pat. Off. | G11B 7/09 |
| 0430497 | 6/1991 | European Pat. Off. | G11B 7/09 |
| 870085529 | 8/1989 | Japan | G11B 7/085 |

Primary Examiner—Aristotelis Psitos
Assistant Examiner—Thang V. Tran
Attorney, Agent, or Firm—Jay H. Maioli

[57] ABSTRACT

A focus servo device for use in an optical disk apparatus including a reproducer for irradiating a light beam emitted from a light source to an optical disk through an objective lens, and detecting an RF signal and a focus error signal on the basis of the return light beam reflected from the optical disk; a maximum-minimum detector for detecting the maximum and the minimum of the RF signal obtained from the reproducer; and a control signal generator for generating a focus servo signal obtained from the reproducer responsive to the maximum and the minimum of the RF signal detected by the maximum-minimum detector. Since the focus servo lock-in control is performed in conformity with the detected maximum and minimum values of the reproduced RF signal, the apparatus is capable of recording information on and/or reproducing the same from any optical disk regardless of the disk's reflectivity.

3 Claims, 2 Drawing Sheets

SYSTEM FOR CALCULATING FOCUS SERVO CONTROL SIGNAL USING FOCUS ERROR SIGNAL AND REPRODUCED RF SIGNAL

BACKGROUND OF THE INVENTION

1. Field of the Invention

The present invention relates to an optical disk apparatus for recording information on and/or reproducing the same from an optical disk, a magneto-optical disk or the like where information is optically recordable and reproducible. And more particularly it relates to a focus servo device employed in such an optical disk apparatus.

2. Description of the Prior Art

FIG. 1 is a block diagram of an exemplary constitution for executing a control operation to lock in a focus servo device in a conventional magneto-optical disk apparatus. A first comparator 21 compares a focus error signal, which is based on a detection output from an optical pickup, with a predetermined first reference level ref and generates a high-level comparison output if the result of such comparison signifies that the focus error signal is greater. A second comparator 22 compares the focus error signal with a zero signal level and generates a high-level comparison output if the result of the comparison signifies that the focus error signal is greater. Meanwhile a third comparator 23 compares an RF signal with a predetermined second reference signal level ref2 and generates a high-level comparison output if the RF signal is greater.

An output terminal of the first comparator 21 is connected to a clock terminal CK of a first latch circuit 24, and a high-level state of the signal being applied to an input terminal D thereof is latched every time the output of the first comparator 21 is turned to a high level. Then such high-level state of the signal is delivered from an output terminal Q of the first latch circuit 24. An output terminal of the second comparator 22 is connected to a clock terminal CK of a second latch circuit 25 and, every time the output of the second comparator 22 is turned to a high level, a high-level or low-level state of the signal being applied from the output terminal Q of the first latch circuit 24 to the input terminal D of the second latch circuit 25 is latched and then is delivered from its output terminal Q. Reset terminals CLR of the first and second latch circuits 24, 25 are connected to an output terminal of the third comparator 23. When the output of the third comparator 23 is turned to a low level, the first and second latch circuits 24, 25 are cleared so that outputs thereof are turned to a low level.

In the magneto-optical disk apparatus of the constitution mentioned, the focus servo lock-in control is performed in the following procedure. After a magneto-optical disk (not shown) is loaded in a recording and/or playback unit in the magneto-optical disk apparatus, a light beam is irradiated from an optical pickup (not shown) to the magneto-optical disk. Then in the disk apparatus, an objective lens incorporated in the optical pickup is displaced from a far position to a near position with respect to the magneto-optical disk, and a focus error signal is generated in accordance with the output signal of a photo detector obtained by an astigmatic method through a cylindrical lens which is disposed in the optical path of the reflected light beam from the magneto-optical disk to the photo detector. The relationship between the focus error signal and the distance from the objective lens to the magneto-optical disk is represented by an S curve as shown graphically in FIG. 2. (The astigmatic method is disclosed in, for example, U.S. Pat. No. 4,023,033.)

Subsequently in the first comparator 21, the focus error signal thus generated is compared with a predetermined first signal level ref1 which is lower than the zero signal level (below the zero level in FIG. 2) and, when the result of such comparison signifies that the focus error signal is greater, the output of the first comparator 21 is turned to a high level. Therefore the clock terminal CK of the first latch circuit 24 is turned to a high-level state, and the input terminal of the first latch circuit 24 at that moment is also turned to a high-level state, whereby the output terminal of the first latch circuit 24 is turned to a high-level state. In response to such inversion of the output terminal of the first latch circuit 24 to a high-level state, the objective lens is displaced at a low speed under control of a focus actuator (not shown) incorporated in the optical pickup. More specifically, a low-speed displacement of the objective lens is executed in the vicinity of a point where the focus error signal becomes coincident with a zero level (i.e., in the vicinity of a point $P_1$ on the S curve of FIG. 2).

In the second comparator 22, its output terminal is turned to a high-level state when the result of the comparison signifies that the focus error signal is coincident with the zero signal level. Consequently the clock terminal of the second latch circuit 25 is turned to a high-level state. Since the output terminal of the first latch circuit 24 is connected to the input terminal of the second latch circuit 25, the input terminal of the second latch circuit 25 is turned to a high-level state at that moment, whereby the output thereof is turned also to a high level. In response to such inversion of the output of the second latch circuit 25 to a high-level state, a loop switch of a focus servo circuit (not shown) is turned on so that an operation for focus servo lock-in control is performed.

The above operation is performed in a state where the output terminal of the third comparator 23, and consequently the reset terminals of both the first and second latch circuits 24, 25, have been turned to a high-level state after the RF signal compared with a predetermined second signal level ref2 in the third comparator 23 is judged to be greater. Namely, the focus servo lock-in control action is executed when the reflected light beam (corresponding to the RF signal) of the initial beam irradiated from the optical pickup to the magneto-optical disk has a sufficient intensity greater than a predetermined value (corresponding to the signal level ref2).

Thus, in the conventional focus servo device, its operation for focus servo lock-in control is performed if the results of the comparisons signify that the focus error signal is coincident with the predetermined zero signal level and that the RF signal is greater than the predetermined signal level. Therefore, in recording information on and/or reproducing the same from a magneto-optical disk which has a recording layer of a small reflectivity, the RF signal level fails to reach the predetermined signal level and raises a problem that the proper operation for focus servo lock-in control is not achievable.

OBJECT AND SUMMARY OF THE INVENTION

In view of the circumstances mentioned, it is an object of the present invention to provide an improved focus servo device capable of performing, in an optical disk apparatus, a stable operation for focus servo lock-in control regardless of the kind or reflectively of the optical disk loaded therein.

According to one aspect of the present invention, there is provided a focus servo device employed in an optical disk apparatus and comprising playback means for irradiating a light beam emitted from a light source to an optical disk through an objective lens, and detecting an RF signal and a focus error signal on the basis Of the return light beam reflected from the optical disk; maximum-minimum detector means for detecting the maximum and the minimum of the RF signal obtained from the playback means; and control signal generator means for generating a focus servo control signal in conformity with the focus error signal obtained from the playback means and also with the maximum and the minimum of the RF signal detected by the maximum-minimum detector means.

In the above construction, the operation for focus servo lock-in control is performed in conformity with the detected maximum and minimum values of the RF signal. Therefore it becomes possible to realize an improved apparatus which is capable of properly recording and/or reproducing information regardless of the reflectivity of the optical disk.

The above, and other features and advantages of the present invention will become apparent from the following description which will be given with reference to the illustrative accompanying drawings.

DESCRIPTION OF THE PREFERRED EMBODIMENT

Figure 3:
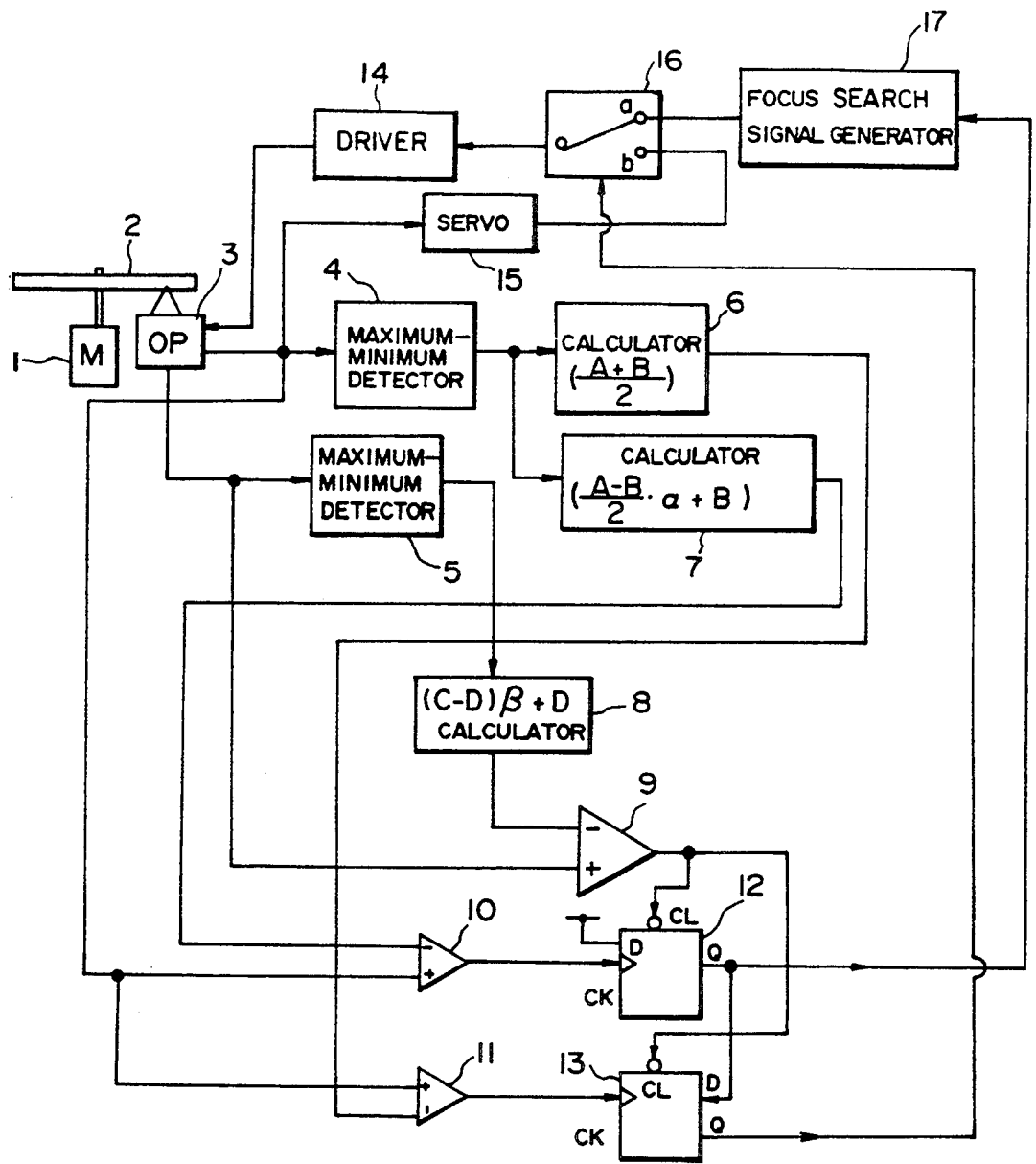
FIG. 3 is a block diagram showing a constitution of an exemplary magneto-optical disk apparatus to which the present invention is applied.

FIG. 3 is a block diagram of an optical disk apparatus with a focus servo device of the present invention, wherein reference numeral 1 denotes a spindle motor for rotating a magneto-optical disk 2 at a fixed linear or angular velocity. The magneto-optical disk 2 is composed of a substrate having a high transmissivity to light and a recording layer of a selected material suited for magneto-optically recording information on and/or reproducing the same from a plurality of record tracks. Denoted by 3 is an optical pickup which consists of a light source with a laser diode; an objective lens for focusing a light beam emitted from the laser diode onto the recording layer on the magneto-optical disk 2; a focus actuator for driving the objective lens in parallel with the optical axis of the lens; a photo diode serving as a photo detector with a plurality of light receiving surfaces to receive, through the objective lens, the return light beam reflected from the magneto-optical disk 2; a beam splitter for splitting the input into the light beam emitted from the laser diode and the return light beam reflected from the magneto-optical disk 2; and an optical element such as a cylindrical lens disposed in the optical path of the return light beam between the beam splitter and the photo detector and capable of generating an astigmatism for detection of the focus error. The optical pickup 3 is displaced in the direction perpendicular to the surface of the magneto-optical disk by a pickup feed mechanism (not shown) and serves to irradiate the light beam, which is focused through the objective lens, from the laser diode onto a desired record track on the magneto-optical disk. The detection output of the photo diode in the optical pickup 3 is supplied to a matrix circuit (not shown), so that there is obtained a reproduced RF signal from the magneto-optical disk 2 corresponding to the sum of the detection outputs from the individual light receiving surfaces of the photo diode, and there is also obtained a focus error signal corresponding to the difference between the detection outputs of the individual light receiving surfaces of the photo diode based on the return light beam received from the magneto-optical disk 2 through the optical element which generates the astigmatism of the optical pickup 3 in relation to the surface deflection of the magneto-optical disk 2.

A focus error maximum-minimum detector 4 detects the maximum (A) and the minimum (B) of the focus error signal obtained from the output signal of the optical pickup 3. Similarly, an RF signal maximum-minimum detector 5 detects the maximum (C) and the minimum (D) of the RF signal obtained from the output signal of the optical pickup 3.

A first calculator 6 calculates an average $((A+B)/2)$ of the maximum (A) and the minimum (B) of the focus error signal detected by the maximum-minimum detector 4. Meanwhile a second calculator 7 multiplies, by a predetermined positive coefficient $\alpha$ smaller than 1, a half of the peak-to-peak value (difference between the maximum and the minimum) obtained from the maximum (A) and the minimum (B) of the focus error signal detected by the maximum-minimum detector 4, and then adds the minimum to the result of such multiplication to thereby calculate $((A-B)/2 \times \alpha + B)$.

A third calculator 8 multiplies, by a predetermined positive coefficient $\beta$ smaller than 1, the peak-to-peak value obtained from the maximum (C) and the minimum (D) detected by the maximum-minimum detector 5, and then adds the minimum to the result of such multiplication to thereby calculate $((C-D) \times \beta + D)$.

A first comparator 9 compares the RF signal with the value obtained from the third calculator 8 and generates a high-level output signal if the result of such comparison signifies that the RF signal is greater, or generates a low-level signal if the RF signal is smaller. A third comparator 11 compares the focus error signal with the value obtained from the first calculator 6 and generates a high-level output signal if the result of the comparison signifies that the focus error signal is greater, or generates a low-level output signal if the focus error signal is smaller. Meanwhile a second comparator 10 compares the focus error signal with the value obtained from the second calculator 7 and generates a high-level output signal if the result of the comparison signifies that the focus error signal is greater, or generates a low-level output signal if the focus error signal is smaller.

An output terminal of the second comparator 10 is connected to a clock terminal CK of a first latch circuit (D-FF) 12, and every time the output of the second comparator 10 is turned to a high level, the high-level state of the signal being applied to its input terminal D is latched, and then a high-level state of the signal is delivered from its output terminal Q. An output terminal of the third comparator 11 is connected to a clock terminal CK of a second latch circuit (D-FF) 13, and every time the output of the third comparator 11 is turned to a high level, a high-level or low-level state of the signal obtained from the output terminal of the first latch circuit 12 and supplied to the input terminal D of the second latch circuit 13 is latched and then is delivered from its output terminal Q. Reset terminals CLR of the first and second latch circuits 12, 13 are connected to the output terminal of the first comparator 9, and when the output of the first comparator 9 is turned to a low level, the first and second latch circuits 12, 13 are cleared so that the outputs thereof are turned to a low level.

There are further shown a driver 14 for driving the focus actuator in the optical pickup 3; a servo circuit 15 for generating a focus servo signal in accordance with the focus error signal from the optical pickup 3 and for supplying such focus servo signal to the driver 14; a switch circuit 16 responsive to a control signal from a system controller (not shown) and the output signal from the second latch circuit 13; and a focus search signal generator 17 for supplying a focus search signal to the focus actuator in the optical pickup 3 in response to the control signal from the system controller, so as to displace the objective lens in a focusing direction perpendicular to the plane of the magneto-optical disk. In the focus search signal generator 17, the focus search signal is controlled in accordance with the output signal from the first latch circuit 12, thereby controlling the displacement speed of the objective lens.

At the start of the focus servo lock-in operation, the switch circuit 16 is connected to a contact a in response to the control signal obtained from the system controller, so that the focus search signal from the focus search signal generator 17 is supplied to the focus actuator in the optical pickup 3. Thereafter the connection of the switch circuit 16 is changed from the contact a to the other contact b in response to the output signal from the second latch circuit 13, so that the focus error signal is supplied to the focus actuator in the optical pickup 3 to thereby execute the focus servo control action. Then the output from the second latch circuit 13 is supplied to the aforementioned system controller, so that the control signal is supplied therefrom to the focus search signal generator 17, whereby generation of the focus search signal is brought to a halt.

In the present invention, although not shown, an external-field generating magnetic head is provided at the opposite position of the optical pickup 3 with respect to the magneto-optical disk 2, so as to record the information signal in cooperation with the optical pickup 3. Therefore, when any desired information is to be recorded on the magneto-optical disk 2, the light beam of a recording power level is irradiated from the optical pickup 3 to one side of the recording layer adjacent to the substrate of the disk, while a perpendicular external magnetic field is applied from the magnetic head disposed on the other side of the recording layer of the magneto-optical disk 2, whereby the information can be recorded on the disk 2.

Now a description will be given on how the operation is performed to execute the focus servo lock-in control. After the magneto-optical disk 2 is loaded in the recording and/or playback unit in the disk apparatus, the motor 2 is so controlled as to rotate the loaded magneto-optical disk 2 at a predetermined rate. Then the light beam emitted from the laser diode incorporated in the optical pickup 3 is radiated on to the magneto-optical disk 2, and the return light beam reflected from the magneto-optical disk 2 is received by the photo detector. An astigmatism generating optical element such as a cylindrical lens is disposed in the optical path of the reflected light beam between the objective lens and the photo detector of the optical pickup 3, and a sawtooth driving signal is supplied from the focus search signal generator 17 to the focus actuator in the optical pickup 3 in a manner to repeat the focus search operation which displaces the objective lens in the optical pickup 3 from a far position to a near position with respect to the magneto-optical disk 2. An RF signal is reproduced from the magneto-optical disk 2 on the basis of the detection output from the photo detector in the optical pickup 3, and also a focus error signal is generated by the astigmatic method on the basis of the detection output from the photo detector in the optical pickup 3. The focus error signal and the RF signal thus obtained are supplied to the maximum-minimum detectors 4, 5 respectively, so that the maximum (A) and the minimum (B) of the focus error signal are detected by the maximum-minimum detector 4, while the maximum (C) and the minimum (D) of the RF signal are detected by the maximum-minimum detector 5.

After detection of the maximum and the minimum of the focus error signal by the maximum-minimum detector 4, an average $((A+B)/2)$ thereof is calculated by the first calculator 6. The average thus obtained corresponds to a point $P_1$ (focus zero-crossing point) on the S curve of FIG. 2 which represents the relationship between the focus error signal and the distance from the magneto-optical disk 2 to the objective lens in the optical pickup 3. When the focus error signal is equal to such average, the focal point of the light beam irradiated from the optical pickup 3 is coincident with the position of the magneto-optical disk 2. Meanwhile the second calculator 7 multiplies, by a predetermined positive coefficient $\alpha$ smaller than 1, a half of the peak-to-peak value, i.e., the difference between the maximum (A) and the minimum (B) of the focus error signal detected by the maximum-minimum detector 4, and then adds the minimum level to the result of such multiplication to thereby calculate $((A-B)/2 \times \alpha + B)$. The value thus obtained corresponds to a point $P_2$ on the S curve shown in FIG. 2.

Further the third calculator 8 multiplies, by a predetermined positive coefficient $\beta$ smaller than 1, the peak-to-peak value relative to the maximum (C) and the minimum (D) of the RF signal detected by the maximum-minimum detector 5, and then adds the minimum to the result of such multiplication to thereby calculate $((C-D) \times \beta + D)$. The value thus obtained corresponds to a point $P_3$ on the curve of FIG. 4 which represents the relationship between the RF signal and the distance from the magneto-optical disk 2 to the objective lens incorporated in the optical pickup 3.

Figure 4:
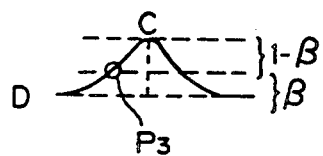
FIG. 4 graphically shows the relationship between a focus error signal and a distance from a magneto-optical disk to an objective lens incorporated in an optical pickup employed in FIG. 3.

After the predetermined calculations are executed in the first, second and third calculators 6 through 8 as described, the RF signal generated on the basis of the detection output from the optical pickup 3 is compared in the first comparator 9 with the value calculated in the third calculator 8 (the RF signal level corresponding to the point $P_3$ in FIG. 4). If the result of such comparison signifies that the RF signal is greater, the output of the first comparator 9 is turned to a low level. Meanwhile, if the result signifies that the RF signal is smaller, the output of the first comparator 9 is turned to a high level. And such output is supplied to the reset terminals CL of both the first and second latch circuits 12, 13. Therefore, when the signal generated on the basis of the detection output from the optical pickup 3 is judged to be greater than the value calculated by the second calculator 8 (the RF signal level corresponding to the point $P_3$ in FIG. 4), the first and second latch circuits 12, 13 are placed in an operable state (where the level of the signal being supplied to the input terminals D is latched at the moment the signal is inputted to the clock terminals CK, and the level of such signal can be delivered from the output terminals Q).

Subsequently in the second comparator 10, the focus error signal is compared with the value calculated by the third calculator 7 (the focus error signal level corresponding to the point $P_2$ in FIG. 4). If the result of such comparison signifies that the focus error signal level is greater, the output of the second comparator 10 is turned to a high level, so that the clock terminal CK of the first latch circuit 12 is turned to a high-level state, and further the input terminal D of the first latch circuit 12 is turned also to a high-level state at that moment, whereby the output terminal Q thereof is turned to a high-level state. In response to such inversion of the output of the first latch circuit 12 to a high level, a control operation is performed for the focus actuator in the optical pickup 2 in such a manner as to displace the objective lens at a low speed. More specifically, the objective lens is displaced at a low speed in case the focus error signal is judged to be greater than the value corresponding to the point $P_2$ on the S curve shown in FIG. 2.

Figure 1:
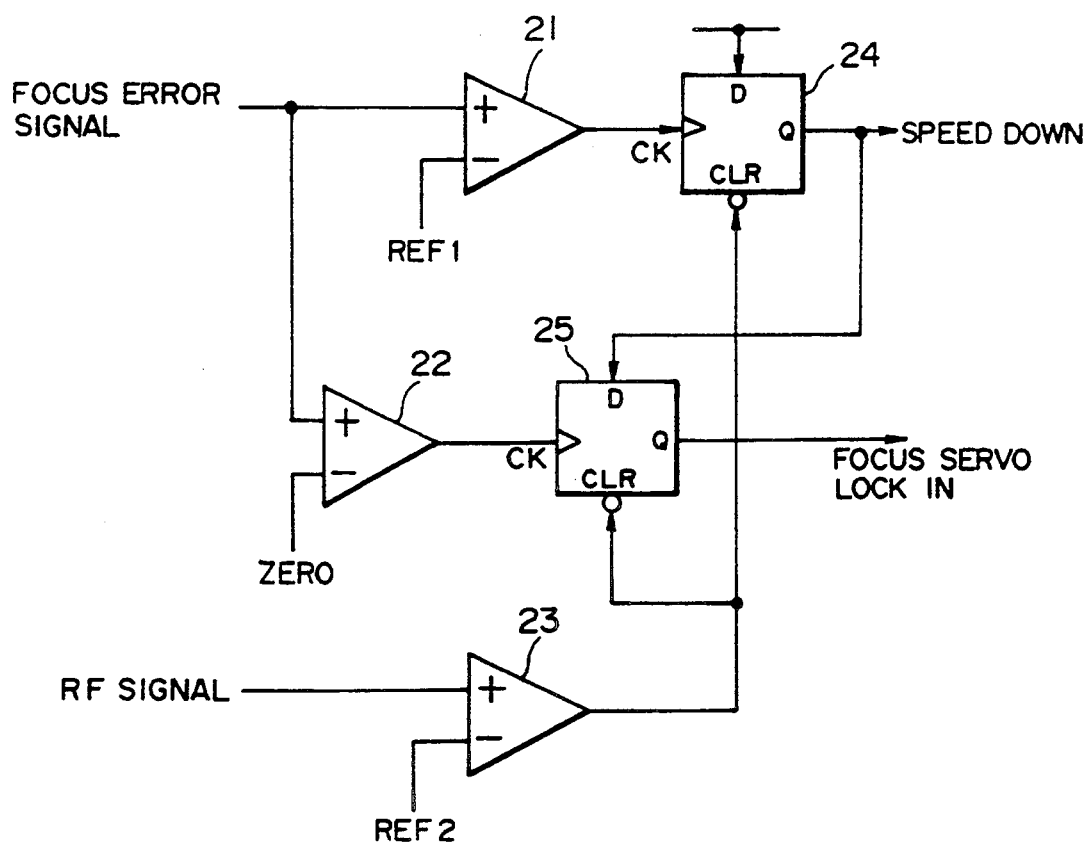
FIG. 1 is a block diagram of an exemplary constitution for executing a control operation to lock in a focus servo device in a conventional magneto-optical disk apparatus.
Figure 2:
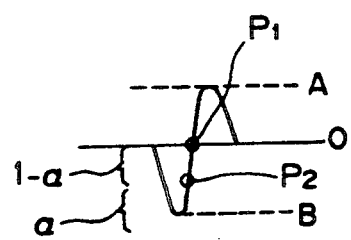
FIG. 2 graphically shows the relationship between an RF signal and a distance from a magneto-optical disk to an objective lens incorporated in an optical pickup employed in FIG. 3.

Further in the third comparator 11, the focus error signal is compared with the value calculated by the first calculator 6 (the focus error signal level corresponding to the point $P_1$ in FIG. 2). If the result of such comparison signifies that the focus error signal is greater, the output of the first comparator 11 is turned to a high level, so that the clock terminal CK of the second latch circuit 13 is turned to a high level state. Since the input terminal of the second latch circuit 13 is connected to the output terminal of the first latch circuit 12, the input of the second latch circuit 13 at that moment is turned to a high level state, so that the output thereof is turned also to a high level. In response to such inversion of the output of the second latch circuit 13 to a high level, a control operation is performed for the focus actuator in such a manner as to halt its drive of the objective lens in a low-speed displacement while turning on the focus servo switch by selectively changing the connection of the switch circuit 16 from the contact a to the contact b. More specifically, when the focus error signal is judged to be equal to the value corresponding to the point $P_1$ on the S curve shown in FIG. 2, the control operation for locking in the focus servo is performed by switching the displacement of the objective lens to the focus servo action based on the focus error signal.

Thus, in the focus servo device employed in the optical disk apparatus of the present invention, the focus servo lock-in control operation is performed in conformity with the maximum and the minimum of the RF signal, hence enabling the apparatus to record or reproduce information on or from any of two or more kinds of optical disks, magneto-optical disks and so forth having different reflectivities.

According to the present invention, as described hereinabove, the maximum and the minimum of the RF signal are detected, and the focus servo lock in control is executed in conformity with the detected values. Consequently it becomes possible to realize an improved apparatus capable of recording information on and/or reproducing the same from any optical disk regardless of the kind.

What is claimed is:

1. A focus servo device for use in an optical disk apparatus, comprising:
    reproducer means for irradiating a light beam emitted from a light source to the optical disk through an objective lens movable relative to the optical disk, and detecting an RF signal and a focus error signal on the basis of a return light beam reflected from said optical disk:
    RF signal maximum-minimum detector means for detecting a maximum and a minimum of the RF signal obtained from said reproducer means; and
    control signal generator means for generating a focus servo control signal in conformity with the focus error signal obtained from said reproducer means and also with the maximum and the minimum of the RF signal detected by said maximum-minimum detector means, wherein said control signal generator means includes focus error signal maximum-minimum detector means for detecting a maximum and a minimum of the focus error signal; calculator means for executing predetermined calculations on the maximum and the minimum of the focus error signal from said focus error signal maximum-minimum detector means; and comparator means for comparing an output signal of said calculator means with the focus error signal, and wherein said calculator means includes a first calculator for calculating an average of the maximum and the minimum of the focus error signal obtained from said focus error signal maximum-minimum detector means, and a second calculator for multiplying, by a predetermined coefficient, one-half of a difference between the maximum and the minimum of the focus error signal obtained from said focus error signal maximum-minimum detector means, and adding the minimum to a result of the multiplication.

2. The focus servo device according to claim 1, further comprising displacement means for displacing said objective lens, said control signal generator means further including control means for producing a control signal to lower a displacement speed of said objective lens in said reproducer means on the basis of the focus error signal and the minimum and maximum of the RF signal from said RF signal maximum-minimum detector means.

3. A focus servo device for use in an optical disk apparatus, comprising:
    reproducer means for irradiating a light beam emitted from a light source to the optical disk through an objective lens movable relative to the optical disk, and detecting an RF signal and a focus error signal on the basis of a return light beam reflected from said optical disk;

RF signal maximum-minimum detector means for detecting a maximum and a minimum of the RF signal obtained from said reproducer means; and control signal generator means for generating a focus servo control signal in conformity with the focus error signal obtained from said reproducer means and also with the maximum and the minimum of the RF signal detected by said maximum-minimum detector means, wherein said control signal generator means includes focus error signal maximum-minimum detector means for detecting a maximum and a minimum of the focus error signal; first calculator means for executing predetermined calculations on the maximum and the minimum of the focus error signal from said focus error signal maximum-minimum detector means; comparator means for comparing an output signal of said first calculator means with the focus error signal; control means for generating said focus servo control signal on the basis of both the maximum and the minimum of the RF signal from said RF signal maximum-minimum detector means and the output signal of said comparator means; and second calculator means for executing a predetermined calculation on the maximum and the minimum of the RF signal from said RF signal maximum-minimum detector means, and wherein said second calculator means multiplies, by a predetermined coefficient, a difference between the maximum and the minimum of the RF signal from said RF signal maximum-minimum detector means, and then adds the minimum to a result of the multiplication.

* * * * *